July 16, 1963 R. E. SCHROEDER ET AL 3,097,907

RECORDING-REPRODUCING MACHINE

Filed April 20, 1961 2 Sheets-Sheet 1

Inventors:
Robert E. Schroeder
Floyd E. Smithberg
By Robert L. Kahn Atty.

July 16, 1963 R. E. SCHROEDER ET AL 3,097,907

RECORDING-REPRODUCING MACHINE

Filed April 20, 1961 2 Sheets-Sheet 2

Inventors:
Robert E. Schroeder
Floyd E. Smithberg
By Robert L. Kahn Atty.

United States Patent Office 3,097,907
Patented July 16, 1963

3,097,907
RECORDING-REPRODUCING MACHINE

Robert E. Schroeder, Geneva, and Floyd E. Smithberg, St. Charles, Ill., assignors to Dukane Corporation, St. Charles, Ill., a corporation of Delaware

Filed Apr. 20, 1961, Ser. No. 104,416
3 Claims. (Cl. 346—17)

This invention relates to a machine for recording and/or reproducing using record media of various kinds. The invention generally is useful where such a machine is enclosed in a housing so that a user has difficulty in knowing whether the record medium is moving past a transducer head during use. The invention is particularly useful for machines utilizing a flexible record belt for dictating machines. As will be pointed out later, the invention is applicable to a wide variety of machines.

Recording-reproducing machines utilizing record belts are well known and are available in a variety of forms on the market. As a rule, such machines have a housing which substantially covers most, if not all, of the operating parts, including the record belts. As is well known, most machines for recording or reproducing on a record medium have a transducer head past which the record medium must travel during recording or reproduction. As far as outside appearances are concerned, it is difficult, if not impossible, for an operator or user of such a machine to tell whether the record medium is moving or not. In many instances, the user of such a machine, particularly during recording, has assumed that the machine was operating properly and the record medium was moving while he was recording when in fact the record medium was not moving. This can occur for a variety of reasons.

This invention makes possible a simple means whereby the user or operator of such a machine has a visual means which will indicate when the record is moving and when it is stationary. In its more general aspect, the invention contemplates a housing containing the recording and/or reproducing machine and record and a source of light, such as an incandescent lamp or a neon light, which is modulated or blinked when a record or other part which must move with the record is in motion. The housing has a window through which the light may be observed.

In one general form that the invention may assume, the record itself functions as the light control element and has one part as an edge thereof provided with alternate transparent and opaque portions. When the record is moving, these alternate light control portions cause the light to flicker and thus indicate that the record is moving. In another form of the invention, a portion of the machine which must rotate when the record moves is provided with a simple means for controlling the light and cause blinking upon record movement.

For a full understanding of the invention, reference will be made to the drawing wherein.

Figure 1:
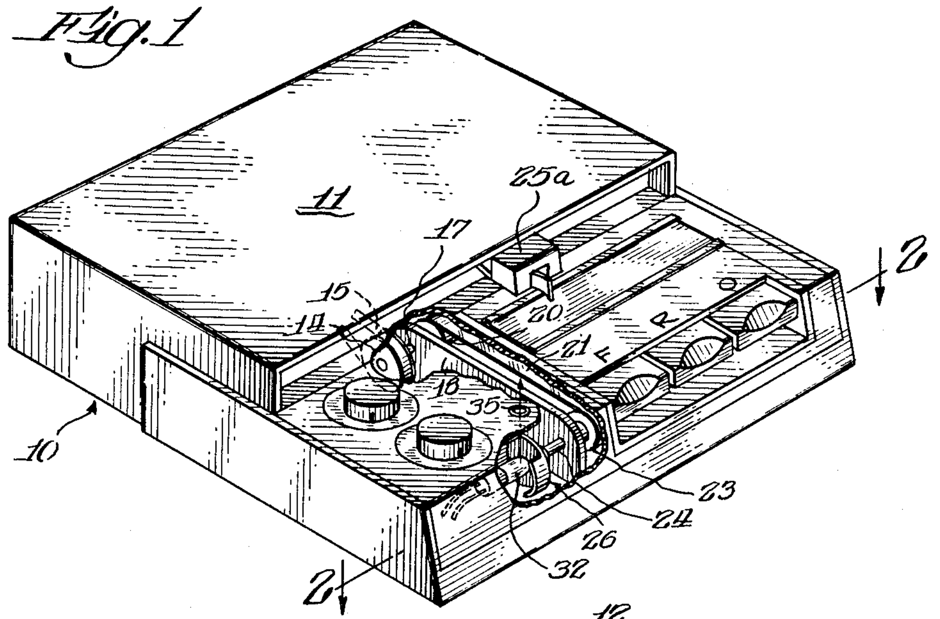
FIGURE 1 is a perspective view of a recording-reproducing machine in which an embodiment of the invention is provided.
Figure 2:
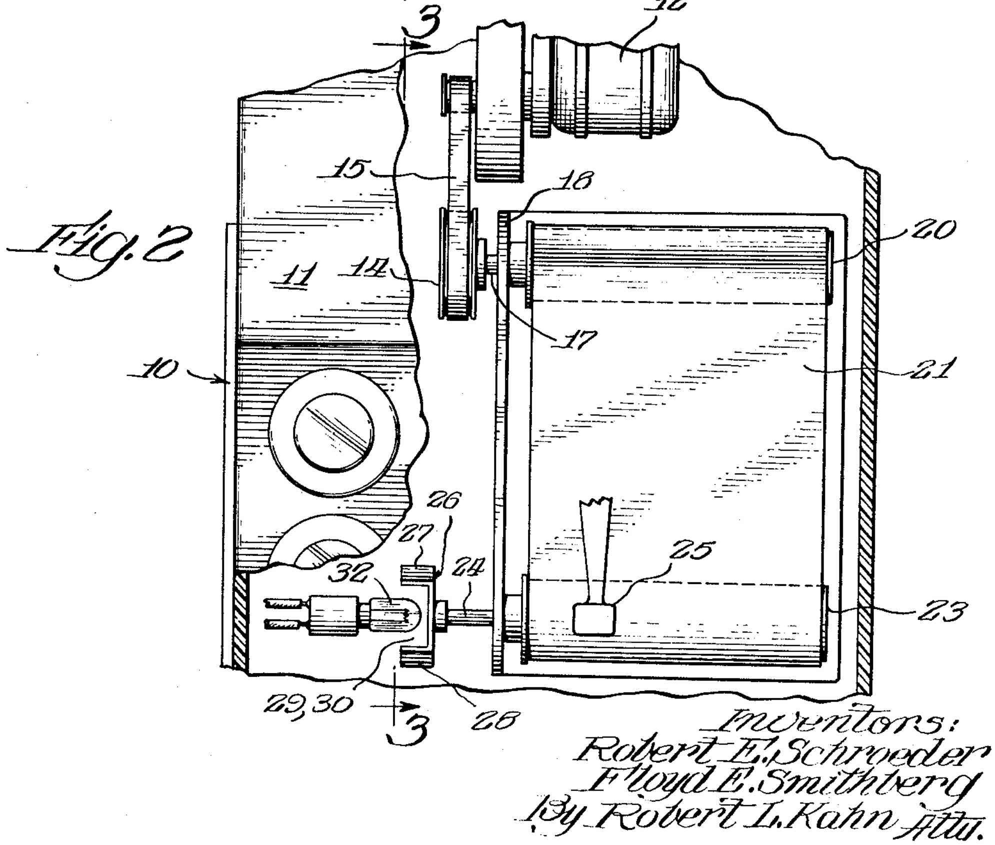
FIGURE 2 is a view upon line 2—2 of FIGURE 1 with the top of the housing broken away.
Figure 3:
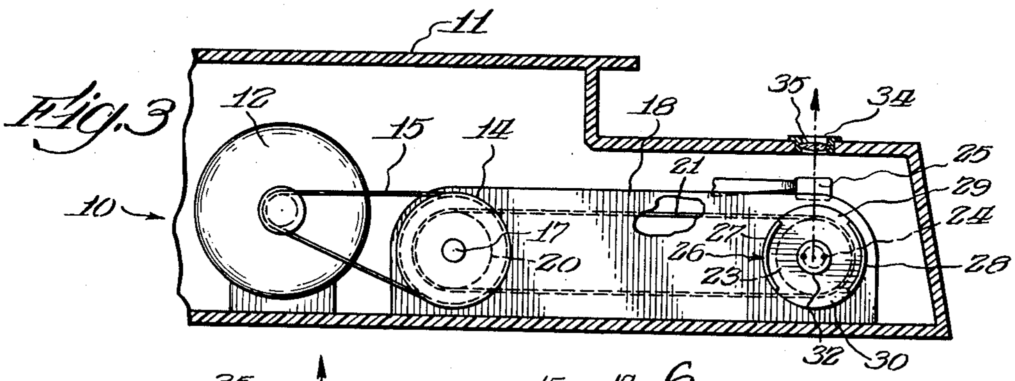
FIGURE 3 is a section upon line 3—3 of FIGURE 2.
Figure 4:
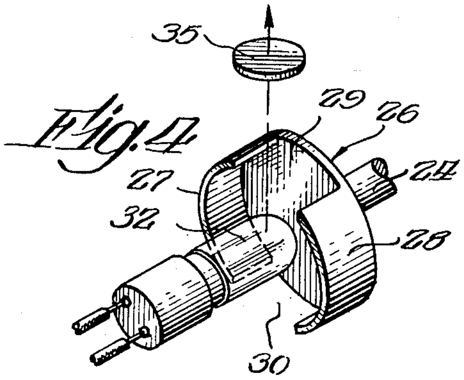
FIGURE 4 is a detail of the blinker part in the machine illustrated in FIGURES 1 to 3 inclusive.

Referring to FIGURES 1 to 3 inclusive, a machine generally indicated by 10 has housing 11 within which there is disposed a suitable recording-reproducing machine. The machine illustrated here uses a record belt. This machine includes electric motor 12 driving pulley 14 by any suitable means such as belt 15. Pulley 14 is carried by shaft 17 journalled in support structure 18. Shaft 17 carries mandrel 20. Disposed over mandrel 20 and driven thereby is record belt 21. Record belt 21 may be of any suitable type. It may be of plastic to be embossed by a stylus or a magnetizable belt such as the record belt disclosed and claimed in United States Patent No. 2,937,028.

As illustrated here, record belt 21 is supported on two mandrels, one of which is mandrel 20 and the other of which is mandrel 23. The two mandrels may be generally similar. Mandrel 23 is provided with shaft 24 suitably journalled in support structure 18. Means may be provided for tensioning belt 21 between the mandrels. As an example, idler means illustrated in United States Patent No. 2,951,127 may be used for belt tensioning.

Cooperating with record belt 21 is a transducer head 25. As an example, the transducer disclosed in the 2,951,127 patent referred to above may be used. There is also generally provided marker mechanism generally indicated by **25*a***, which moves across the belt with the transducer head and may be accessible outside of the housing to be used by an operator. Such a marker mechanism is disclosed in the patent referred to above.

Electric motor 12 may be controlled so that it will drive belt 21 in the required direction for recording or reproduction. If desired, means may be provided for reversing the direction of belt travel during erasing. However, such belt driving means is well known and for the purposes of the present invention need not be discussed in detail. Control buttons F, R and O for Off, Reverse and On may be used for controlling the operation of the machine or a hand mike-speaker with controls may be used as disclosed in the 2,951,127 patent.

It will be observed that mandrel 23 will turn when record belt 21 moves. In accordance with the present invention, shaft 24 for mandrel 23 carries at the end thereof blinker 26 having light interrupting portions 27 and 28 separated by light transmitting portions 29 and 30. Blinker 26 has incandescent or neon bulb 32 disposed so that when bulb 32 is lit, the light as viewed outside the machine is interrupted or blinked when blinker 26 turns with shaft 24. Bulb 32 can be energized when the entire machine is turned on or when the motor is running or when the belt is supposed to be moving. The bulb will be lit to provide a light which will blink during machine operation. In order for the user to see the light blinking, housing 11 is provided with window 34, which window may be closed by lens 35.

It is understood that blinker member 26 may take on a wide variety of forms and shapes depending upon the direction in which the light is viewed, the direction that shaft 24 points. Instead of having a blinker for cutting off the light, it is possible to have member 26 reflective and disposed the light bulb so that reflected light can be flashed into the housing window.

In the embodiment so far described, mandrel 20 will be the driver irrespective of the direction of movement of the belt. In the machine disclosed and claimed in the 2,951,127 patent, means are provided for having one mandrel as one driver for one direction and the other mandrel as the other driver for the other direction. This arrangement may be used in the embodiment illustrated in FIGURES 1 to 4 inclusive, if desired. In all cases, it is preferable to have the blinker on the idler mandrel when the belt is travelling in the normal direction for recording or reproducing. However, the blinker can be on either mandrel shaft or in fact can be on any rotating part which turns when the belt travels. The closer functionally the relation of the blinker rotation is to the record belt movement, the greater will be the reliability of the blinker as an indicator of belt travel.

Figure 5:
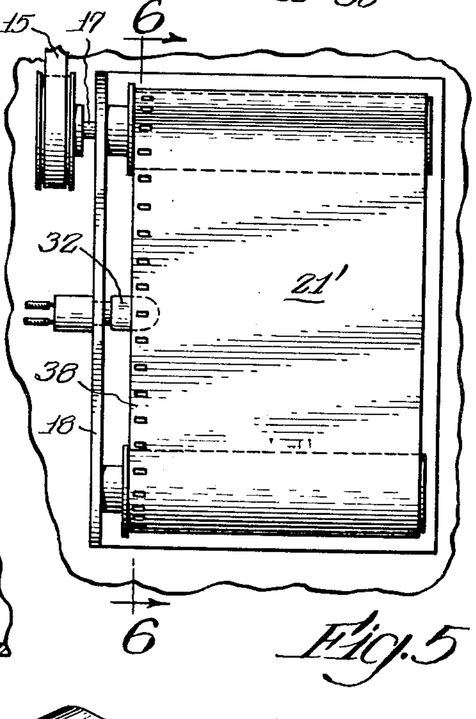
FIGURE 5 is a view looking down upon a portion of a machine illustrating a modified form of the invention.
Figure 6:
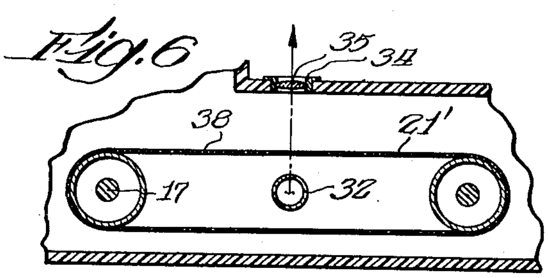
FIGURE 6 is a detail upon line 6—6 of FIGURE 5.
Figure 7:
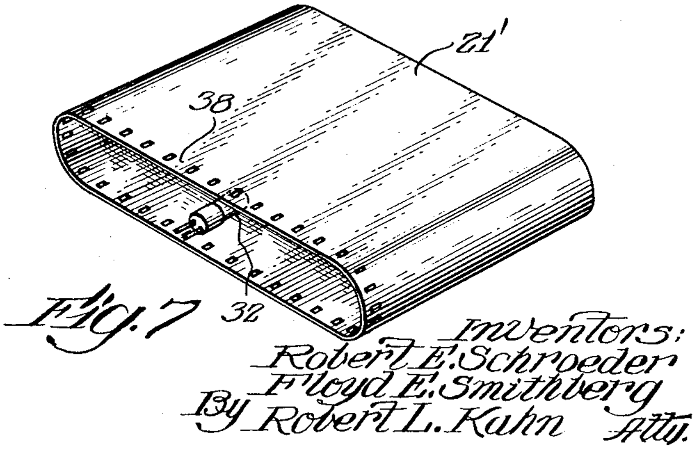
FIGURE 7 is a perspective view of a belt and light in the modified form of the invention.

It is also possible to have the blinking action performed by the record belt itself. Referring now to FIGURES 5 to 7 inclusive, record belt 21' is generally similar to record 21 except that at one belt portion, as for example edge portion 38, the record belt is provided with alternate transparent (or translucent) portions and opaque portions. This may be accomplished in a number of ways. Thus slots or holes may be punched in the belt or the belt may be of translucent or transparent material with opaque material disposed at spaced intervals along the edge. Thus if the magnetic oxide is provided, it may be removed at intervals to expose the translucent or transparent belt body. Incandescent bulb 32 would perform the same function but cooperates with the belt. A suitable opening in the machine housing would be provided for viewing the blinking light, as in FIGURES 1 to 4 inclusive.

It is also possible to use a belt portion for reflecting light with non-reflecting portions alternating with reflecting portions. In such case, the light bulb would be disposed in such fashion that the control portion of the record belt would reflect light into the housing window when the reflecting parts are in proper position.

While the invention has been disclosed and described specifically in connection with a machine for recording and/or reproducing on a record belt driven by two mandrels, it is understood that this is exemplary. For example, the invention could equally well be utilized in a machine having only one mandrel for accommodating a record belt. In such case, a blinker can rotate with the mandrel. Or a light can be disposed within the interior of the mandrel and shine through suitable slots in the mandrel. In such case, the belt would have a transparent portion, or the mandrel could have a transparent plastic portion for supporting the belt and the belt provided with alternate transparent and opaque portions.

The invention may also be applied to machines having records in the form of discs, tape or wire and may also be applied generally to records of the magnetic or non-magnetic type wherein a stylus or other means is relied upon for cutting a groove or other record track. The only requirement is that in all such cases, the machine be provided with a housing within which a transducer head is present and past which the record medium is moved during recording or reproduction. Such housing will be provided with a window through which the blinking light may be observed when the record is moving.

In the case of a tape or wire machine, it will be possible to have a blinker driven by or with the capstan driving the tape or wire. In all instances, the blinking may be obtained by reflecting light or interrupting light.

In case the window for the housing is not in the line of vision where the blinking occurs (at blinker 26 or the belt edge) it is possible to use a light conductive rod as a Lucite rod in the light path for making a corner or offset.

It is evident that this invention provides a simple means for alerting an operator to the possibility that a record medium is not moving when it is supposed to be.

What is claimed is:

1. In a machine for recording or reproducing signals on a record belt, said machine having a transducer head cooperating with the record belt and the machine including as a part thereof a manually controlled power drive for moving said record belt past said transducer head during machine operation, said power drive beginning with an electric motor as the power source and having power transmitting components for directing the flow of power from said power source to said record belt, said power transmitting components including a mandrel in frictional engagement with said record belt for driving the same, said machine including a housing substantially concealing the mechanism and said record belt from observation during normal use of said machine, an electric lamp supported within said housing and continuously energized during machine energization, said housing having a window at the end of a light path entirely within said housing and having the electric lamp at the other end of said light path, said window permitting light to pass through it to the exterior of said housing, mechanical means disposed in the light path for blinking said light, and means for operating said light blinking means from said power drive at a power take-off point which is at least as remote from said power source as said drive mandrel whereby the blinking of the light at the window provides an indication that in response to the manual control, power is available at said drive mandrel for driving the record belt.

2. The construction according to claim 1 wherein said record belt has an edge portion provided with alternate regions for completing and interrupting light along the light path, this record belt edge portion constituting the mechanical light blinking means and the blinking of said light providing an indication that said record belt is being driven by said drive mandrel.

3. The construction according to claim 1 wherein said machine includes a follower mandrel, the record belt being disposed over and frictionally coupled to both mandrels and means rigidly securing said light blinking means to said follower mandrel whereby the blinking of said light indicates that said record belt is being driven by said drive mandrel.

References Cited in the file of this patent

UNITED STATES PATENTS

| | | |
|---|---|---|
| 2,433,908 | Jackson | Jan. 6, 1948 |
| 2,515,169 | Banks | July 18, 1950 |
| 2,683,568 | Lindsay | July 13, 1954 |
| 2,706,118 | Camras | Apr. 12, 1955 |

FOREIGN PATENTS

| | | |
|---|---|---|
| 4,096 | Great Britain | Feb. 17, 1913 |